(12) United States Patent
Park

(10) Patent No.: US 11,131,750 B2
(45) Date of Patent: *Sep. 28, 2021

(54) RADAR DEVICE FOR VEHICLE

(71) Applicant: LG INNOTEK CO., LTD., Seoul (KR)

(72) Inventor: Dong Chan Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 77 days.

This patent is subject to a terminal disclaimer.

(21) Appl. No.: 16/590,600

(22) Filed: Oct. 2, 2019

(65) Prior Publication Data

US 2020/0033440 A1 Jan. 30, 2020

Related U.S. Application Data

(63) Continuation of application No. 15/518,155, filed as application No. PCT/KR2015/009732 on Sep. 16, 2015, now Pat. No. 10,473,754.

(30) Foreign Application Priority Data

Oct. 8, 2014 (KR) .......................... 10-2014-0135995

(51) Int. Cl.
*G01S 7/03* (2006.01)
*H01Q 1/42* (2006.01)
(Continued)

(52) U.S. Cl.
CPC ................. *G01S 7/032* (2013.01); *G01S 7/03* (2013.01); *G01S 13/87* (2013.01); *G01S 13/931* (2013.01);
(Continued)

(58) Field of Classification Search
CPC .. G01S 13/87; G01S 13/931; G01S 2007/027; G01S 2013/9315;
(Continued)

(56) References Cited

U.S. PATENT DOCUMENTS 7,126,525 B2 10/2006 Suzuki et al.
8,988,309 B2 3/2015 Binzer et al.
(Continued)

FOREIGN PATENT DOCUMENTS

JP 2005223470 A 8/2005
KR 102006007489 A 7/2006
(Continued)

OTHER PUBLICATIONS

International Search Report in International Application No. PCT/KR2015/009732, filed Sep. 16, 2015.
(Continued)

*Primary Examiner* — Timothy X Pham
(74) *Attorney, Agent, or Firm* — Saliwanchik, Lloyd & Eisenschenk

(57) ABSTRACT

A radar device for a vehicle, according to an embodiment of the present invention, comprises: a case; a first printed circuit board (PCB) that is accommodated in the case and has a plurality of antenna arrays and an integrated circuit (IC) chip that are formed thereon, wherein the IC chip is connected to the plurality of antenna arrays; and a radome that is coupled to the case and covers the first printed circuit board, wherein the radome includes: a cover facing the first printed circuit board; a first wall connected to the cover surface; and a second wall connected to the cover and facing the first wall, wherein the internal angle between the cover and the first wall and the internal angle between the cover and the second wall are formed to be greater than 90° and less than 180°.

17 Claims, 10 Drawing Sheets

(51) Int. Cl.
*G01S 13/931* (2020.01)
*H01Q 21/06* (2006.01)
*G01S 13/87* (2006.01)
*H01Q 1/32* (2006.01)
*G01S 7/02* (2006.01)
*H01Q 23/00* (2006.01)

(52) U.S. Cl.
CPC ............. *H01Q 1/3233* (2013.01); *H01Q 1/42* (2013.01); *H01Q 21/06* (2013.01); *H01Q 21/065* (2013.01); *G01S 7/027* (2021.05); *G01S 2013/9315* (2020.01); *G01S 2013/93272* (2020.01); *G01S 2013/93274* (2020.01); *H01Q 23/00* (2013.01)

(58) Field of Classification Search
CPC . G01S 2013/93272; G01S 2013/93274; G01S 7/03; G01S 7/032; H01Q 1/3233; H01Q 1/42; H01Q 21/06; H01Q 21/065; H01Q 23/00
See application file for complete search history.

(56) References Cited

U.S. PATENT DOCUMENTS

| | | | |
|---|---|---|---|
| 9,110,162 | B2 | 8/2015 | Matsuzawa et al. |
| 9,157,986 | B2 | 10/2015 | Waldschmidt et al. |
| 2007/0085728 | A1* | 4/2007 | Matsuoka ............. G01S 13/931 342/70 |
| 2012/0139786 | A1 | 6/2012 | Puzella et al. |
| 2013/0181859 | A1 | 7/2013 | Waldschmidt et al. |
| 2013/0229299 | A1 | 9/2013 | Matsuzawa et al. |
| 2016/0197399 | A1 | 7/2016 | Davy et al. |

FOREIGN PATENT DOCUMENTS

| | | |
|---|---|---|
| KR | 100744610 B1 | 8/2007 |
| KR | 100872380 B1 | 12/2008 |
| KR | 1020140037360 A | 3/2014 |

OTHER PUBLICATIONS

Notice of Allowance dated Jul. 2, 2019 in U.S. Appl. No. 15/518,155.
Office Action dated Mar. 1, 2019 in U.S. Appl. No. 15/518,155.

* cited by examiner

| Type | Farfield |
|---|---|
| Approximation | enabled (kR >> 1) |
| Monitor | farfield (f=76.5) [1] |
| Component | Abs |
| Output | Gain |
| Frequency | 76.5 |
| Rad. effic. | -0.8439 dB |
| Tot. effic. | -0.8940 dB |
| Gain | 18.09 dB |

RADAR DEVICE FOR VEHICLE

CROSS-REFERENCE TO RELATED APPLICATIONS

This application is a continuation of U.S. application Ser. No. 15/518,155, filed Apr. 10, 2017; which is the U.S. national stage application of International Patent Application No. PCT/KR2015/009732, filed Sep. 16, 2015, which claims priority to Korean Application No. 10-2014-0135995, filed Oct. 8, 2014, the disclosures of each of which are incorporated herein by reference in their entirety.

TECHNICAL FIELD

The present invention relates to a radar device for a vehicle, and more particularly, to a radome of a radar device for a vehicle.

BACKGROUND ART

A radar device for a vehicle is installed on the exterior of a vehicle and can detect or trace a distance, a speed, and an angle of a target device through radio wave transmission and reception.

Such a radar device for a vehicle includes internal electronic elements, such as an antenna configured to transmit or receive a radio wave and a radio frequency integrated circuit (RFIC) for a millimeter wave (mmWAVE), and a radome configured to protect the internal electronic elements. The radome functions to mechanically protect the internal electronic elements of the radar device for a vehicle from the external environment and minimize the loss of a radio wave transmitted to or received from the outside.

The radar device for a vehicle can be installed at the front or rear of a vehicle. A radar device for a vehicle installed at the front of a vehicle needs to have a remote detecting function and accordingly needs a high gain and a narrow beam width. Accordingly, the radome of the radar device for a vehicle installed at the front can have a planar shape having a uniform dielectric constant.

Meanwhile, since a radar device for a vehicle installed at the rear of a vehicle needs to detect areas in lateral and rearward directions of the vehicle which are not visible through side mirrors, the radar device for a vehicle needs a wide detection angle which is greater than or equal to a 130° field of view (FOV). To this end, there has been an attempt to use a wide angle antenna having a wide beam width, but there is a problem in that it is difficult to obtain a detection angle of a 130° FOV or more only with the wide angle antenna.

DISCLOSURE

Technical Problem

The present invention is directed to providing a radar device for a vehicle.

Technical Solution

One aspect of the present invention provides a radar device for a vehicle including a case, a first printed circuit board (PCB) which is accommodated in the case and on which a plurality of antenna arrays and an integrated circuit (IC) chip connected to the plurality of antenna arrays are formed, and a radome coupled to the case and configured to cover the first PCB, wherein the radome includes: a cover surface facing the first PCB, a first wall surface connected to the cover surface, and a second wall surface connected to the cover surface and configured to face the first wall surface, wherein an internal angle between the cover surface and the first wall surface and an internal angle between the cover surface and the second wall surface are greater than 90° and less than 180°.

The internal angle between the cover surface and the first wall surface may be greater than the internal angle between the cover surface and the second wall surface.

The radar device for a vehicle may further include a third wall surface connected to the cover surface and interposed between the first wall surface and the second wall surface and a fourth wall surface connected to the cover surface and configured to face the third wall surface, wherein an internal angle between the cover surface and the third wall surface and an internal angle between the cover surface and the fourth wall surface are less than the internal angle between the cover surface and the first wall surface and the internal angle between the cover surface and the second wall surface.

Each of the antenna arrays may include a plurality of wide angle antennas arranged in a row, and the plurality of antenna arrays may be arranged in parallel to each other.

The first wall surface and the second wall surface may be disposed in a direction in which the plurality of antenna arrays are arranged, and the third wall surface and the fourth wall surface may be disposed in a direction perpendicular to the direction in which the plurality of antenna arrays are arranged.

The first PCB may be coated with an antioxidant.

The radar device for a vehicle may be disposed at a rear of a vehicle.

The radar device for a vehicle may further include a shield portion interposed between the IC chip formed on the first PCB and the radome and configured to block a radio frequency (RF) signal generated by the first PCB.

The radar device for a vehicle may further include a second PCB which is accommodated in the case and on which a circuit for digital signal processing (DSP) is formed, and a connector configured to connect the first PCB and the second PCB to an external device.

The radar device for a vehicle may further include a bracket interposed between the first PCB and the second PCB and configured to block a noise generated by the second PCB.

The connector may include a controller area network (CAN) connector.

Another aspect of the present invention provides a radome of a radar device for a vehicle including a cover surface configured to cover a printed circuit board (PCB), on which a plurality of antenna arrays and an integrated circuit (IC) chip connected to the plurality of antenna arrays are formed, and facing the PCB, a first wall surface connected to the cover surface, and a second wall surface connected to the cover surface and configured to face the first wall surface, wherein an internal angle between the cover surface and the first wall surface and an internal angle between the cover surface and the second wall surface are greater than 90° and less than 180°.

The internal angle between the cover surface and the first wall surface may be greater than the internal angle between the cover surface and the second wall surface.

The radome may further include a third wall surface connected to the cover surface and interposed between the first wall surface and the second wall surface, and a fourth wall surface connected to the cover surface and facing the third wall surface, wherein an internal angle between the cover surface and the third wall surface and an internal angle between the cover surface and the fourth wall surface are less than the internal angle between the cover surface and the first wall surface and the internal angle between the cover surface and the second wall surface.

Another aspect of the present invention provides a radome of a radar device for a vehicle including a cover surface configured to cover a printed circuit board (PCB) on which a plurality of antenna arrays and an integrated circuit (IC) chip connected to the plurality of antenna arrays are formed, and configured to face the PCB, a first wall surface connected to the cover surface, and a second wall surface connected to the cover surface and configured to face the first wall surface, wherein the first wall surface is unparallel to the second wall surface.

The radome may further include a third wall surface connected to the cover surface and interposed between the first wall surface and the second wall surface, and a fourth wall surface connected to the cover surface and configured to face the third wall surface, wherein the third wall surface is parallel to the fourth wall surface.

A distance between the first wall surface and the second wall surface may be increased in a direction that recedes from the cover surface.

An internal angle between the cover surface and the first wall surface may be greater than an internal angle between the cover surface and the second wall surface.

Advantageous Effects

According to embodiments of the present invention, a detection angel of a radar device for a vehicle can be increased. Accordingly, a radar device installed at the rear of a vehicle can detect areas in lateral and rearward directions of the vehicle which are not visible through side mirrors. The radar device for a vehicle according to the embodiment of the present invention may be applied to a 77 GHz antenna which uses a 76 to 81 GHz frequency band. Accordingly, a radar device for a vehicle having a wide angle, a small size, and a light weight can be obtained.

MODES OF THE INVENTION

Figure 1:
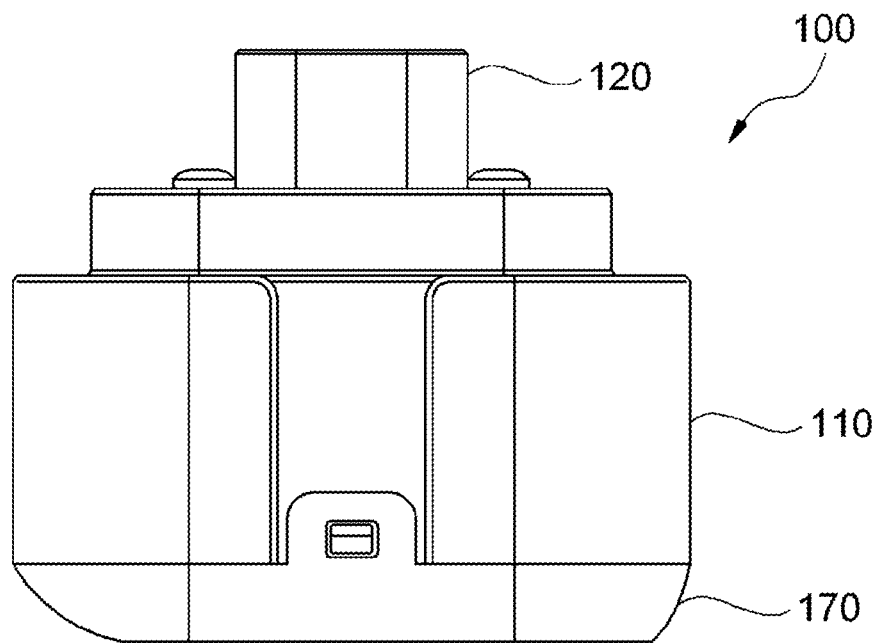
FIG. 1 is a plan view illustrating a radar device for a vehicle according to one embodiment of the present invention in a first direction.

While the invention may be modified in various ways and take on various alternative forms, specific embodiments thereof are shown in the drawings and described in detail below as examples. However, it should be understood that there is no intent to limit the invention to the particular forms disclosed and that the invention covers all modifications, equivalents, and alternatives falling within the spirit and scope of the appended claims.

Although terms including ordinal terms such as first, second, etc. may be used herein in reference to elements of the invention, such elements are not to be construed as limited by these terms. These terms are only used to distinguish one element from another. For example, a first element could be termed a second element and a second element could be termed a first element without departing from the scope of the present invention. Herein, the term "and/or" includes any and all combinations of one or more referents.

It should be understood that when an element is referred to as being "connected" or "coupled" to another element, the element can be directly connected or coupled to the other element, or intervening elements may be present therebetween. In contrast, when an element is referred to as being "directly connected" or "directly coupled" to another element, there are no intervening elements.

The terminology used herein to describe embodiments of the invention is not intended to limit the scope of the invention. The articles "a," "an," and "the" are singular in that they have a single referent, however the use of the singular form in the present document does not preclude the presence of more than one referent. In other words, elements of the invention referred to in the singular may number one or more unless the context clearly indicates otherwise. It should be further understood that the terms "comprise," "comprising," "include," and/or "including," when used herein, specify the presence of stated features, numbers, steps, operations, elements, and/or components, but do not preclude the presence or addition of one or more other features, numbers, steps, operations, elements, components, and/or groups thereof.

Unless otherwise defined, all terms including technical and scientific terms used herein have the same meaning as commonly understood by one of ordinary skill in the art to which this invention belongs. It should be further understood that terms, such as those defined in commonly used dictionaries, should be interpreted as having a meaning that is consistent with their meaning in the context of the relevant art and are not to be interpreted in an idealized or overly formal sense unless expressly so defined herein.

Hereinafter, embodiments of the invention will be described in detail with reference to the accompanying drawings, and the same or corresponding elements will be consistently denoted by the same reference numerals and will not be repeatedly described regardless of the reference numerals.

Figure 2:
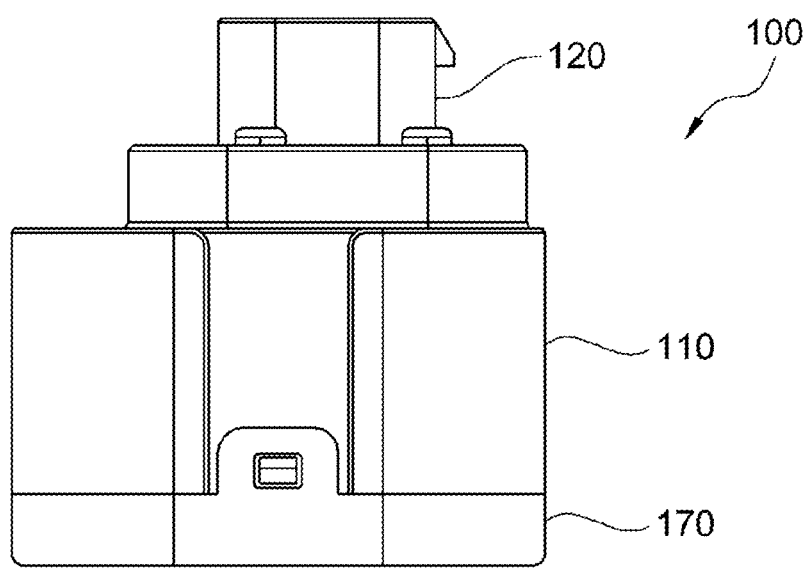
FIG. 2 is a plan view illustrating the radar device for a vehicle in FIG. 1 in a second direction.
Figure 3:
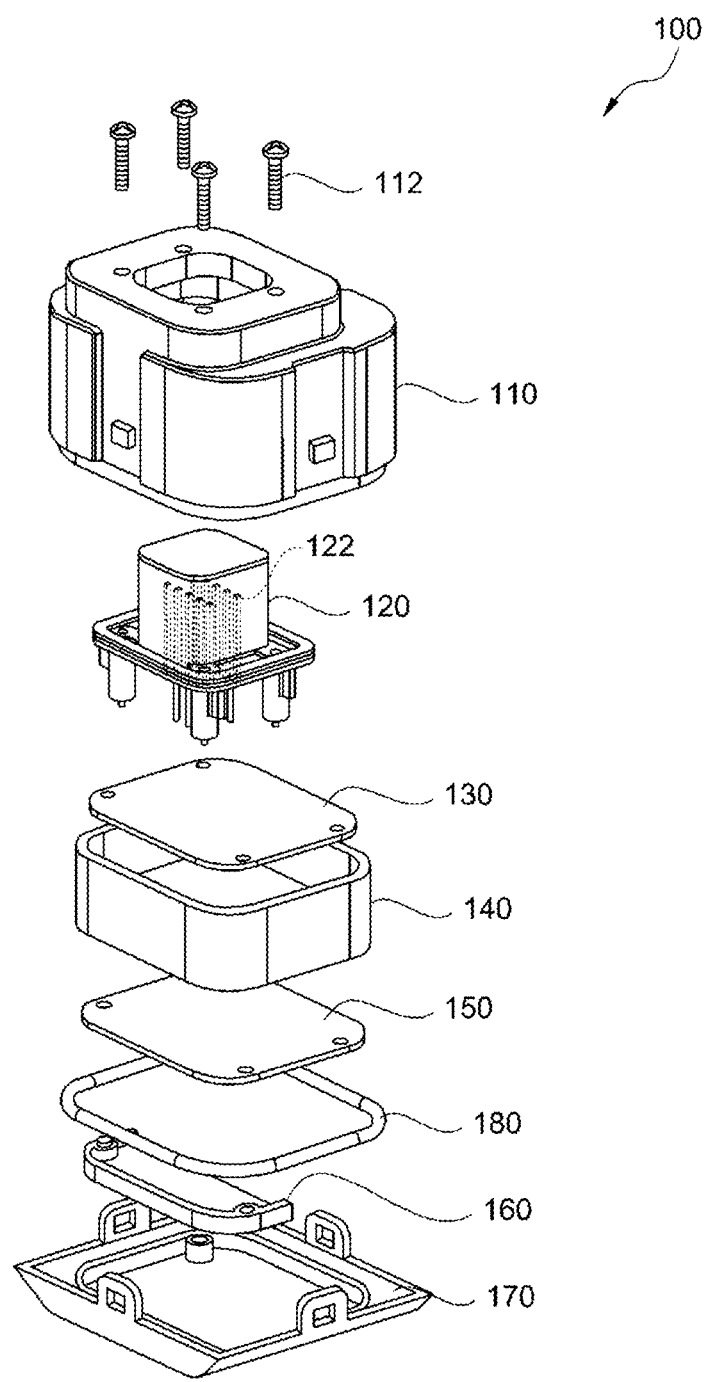
FIG. 3 is an exploded perspective view illustrating the radar device for a vehicle in FIG.
Figure 4:
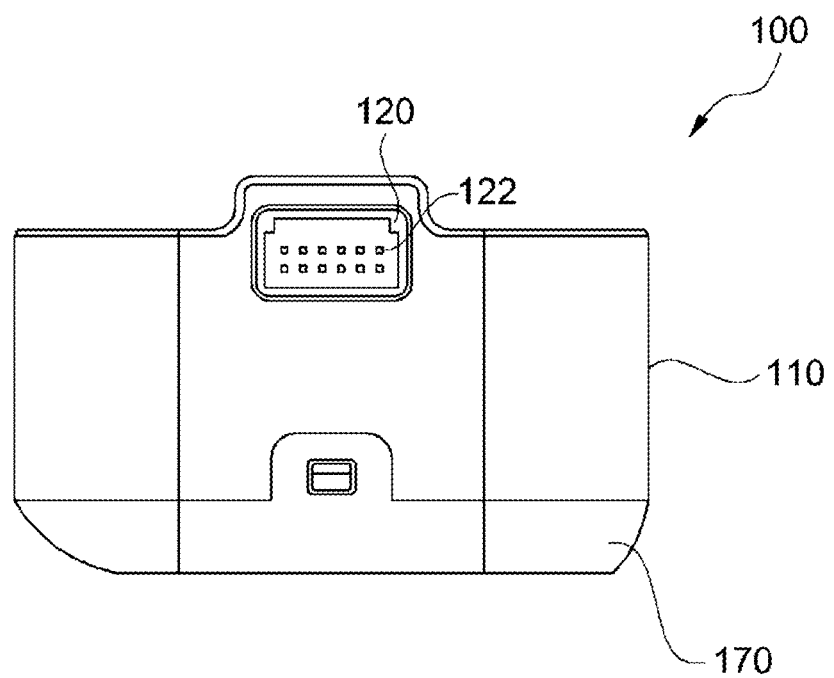
FIG. 4 is a plan view illustrating a radar device for a vehicle according to another embodiment of the present invention in a first direction.
Figure 5:
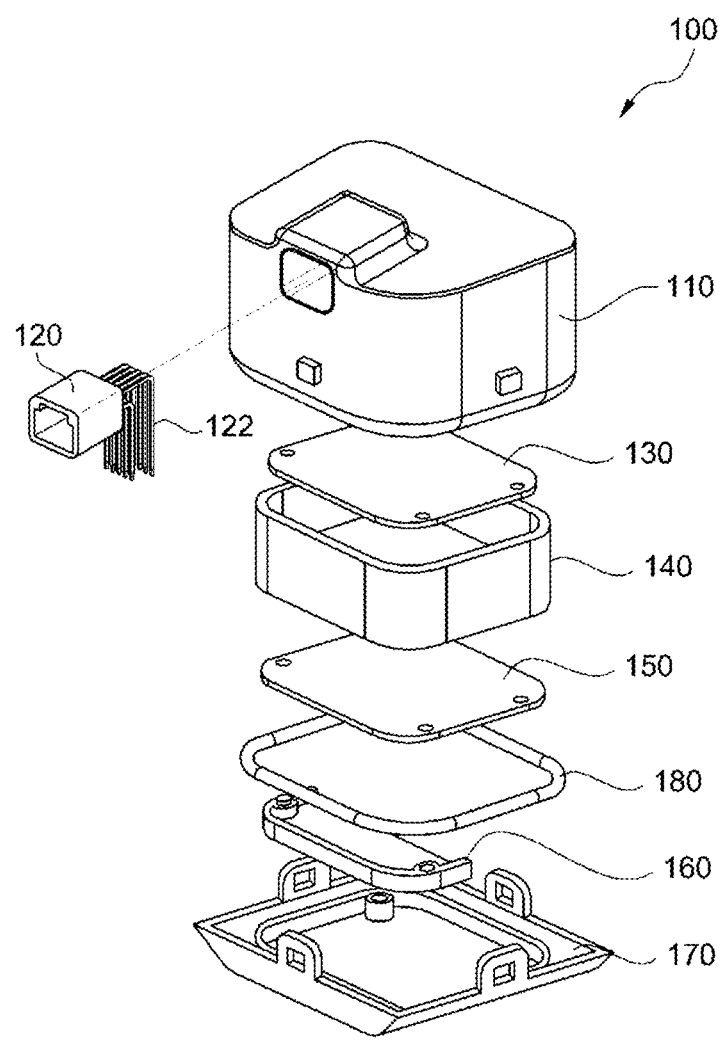
FIG. 5 is an exploded perspective view illustrating the radar device for a vehicle in FIG. 4.

FIG. 1 is a plan view illustrating a radar device for a vehicle according to one embodiment of the present invention in a first direction, FIG. 2 is a plan view illustrating the radar device for a vehicle in FIG. 1 in a second direction, FIG. 3 is an exploded perspective view illustrating the radar device for a vehicle in FIG. 1, FIG. 4 is a plan view illustrating a radar device for a vehicle according to another embodiment of the present invention in a first direction, and FIG. 5 is an exploded perspective view illustrating the radar device for a vehicle in FIG. 4.

Referring to FIGS. 1 to 5, a radar device 100 for a vehicle includes a case 110, a connector 120, a printed circuit board (PCB) 130, a bracket 140, a PCB 150, a shield portion 160, a radome 170, and a waterproof ring 180.

The case 110 is configured to accommodate the connector 120, the PCB 130, the bracket 140, the PCB 150, and the shield portion 160.

The connector 120 may be accommodated in the case 110 and coupled to the case 110 by bolts 112. The connector 120 may connect the PCB 130 and the PCB 150 to external devices (not shown), and signals may be transmitted between the PCB 130, the PCB 150, and the external devices through the connector 120. The connector 120 may include at least one pin 122 to connect the PCB 130 and the PCB 150 to the external devices. The connector 120 may be installed to pass through a bottom surface of the case 110 as illustrated in FIGS. 1 to 3 or may be installed to pass through a side surface of the case 110 as illustrated in FIGS. 4 to 5. For example, the connector 120 may be a controller area network (CAN) connector.

The PCB 130 may be accommodated in the case 110 and connected to the connector 120. A circuit for a power source and digital signal processing (DSP) is formed on the PCB 130.

The bracket 140 is accommodated in the case 110 and blocks noise generated during DSP at the PCB 130.

The PCB 150 may be accommodated in the case 110 and connected to the connector 120. A plurality of antenna arrays and an integrated circuit (IC) chip connected to the plurality of antenna arrays may be provided on one surface of the PCB 150. Here, one antenna array may include a plurality of wide angle antennas arranged in a row. In addition, the IC chip may be a radio frequency integrated circuit (RFIC) for a millimeter wave (mmWAVE). Although not illustrated in the drawings, the plurality of antenna arrays and the IC chip may be provided on a surface of the PCB 150 facing the radome 170.

The PCB 150 may be disposed to be spaced apart from the PCB 130 with the bracket 140 interposed therebetween.

The shield portion 160 is accommodated in the case 110 and blocks a radio frequency (RF) signal generated by the IC chip on the PCB 150. To this end, the shield portion 160 may be disposed at a region corresponding to the IC chip on the PCB 150.

The radome 170 covers the PCB 150. The radome 170 may be coupled to the case 110 or fixed to the case 110 using protruding units and recessed units. Meanwhile, the waterproof ring 180 may be further disposed between the radome 170 and the case 110. Accordingly, a phenomenon in which water leaks into an inside of the radar device 100 for a vehicle according to one embodiment of the present invention can be inhibited. For example, the waterproof ring 180 may be made of an elastic material.

According to one embodiment of the present invention, at least one wall surface of the radome 170 is obliquely formed.

This will be described more specifically with reference to the drawings.

Figure 6:
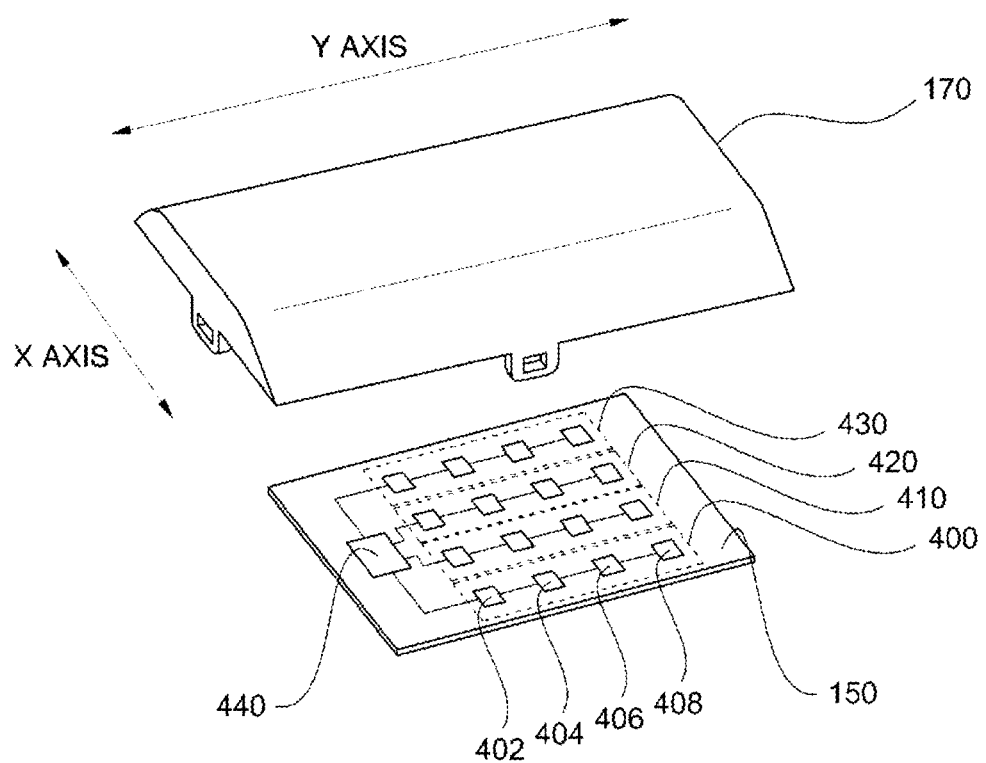
FIG. 6 is a view illustrating a radome and a printed circuit board (PCB) of the radar device for a vehicle according to one embodiment of the present invention.
Figure 7:
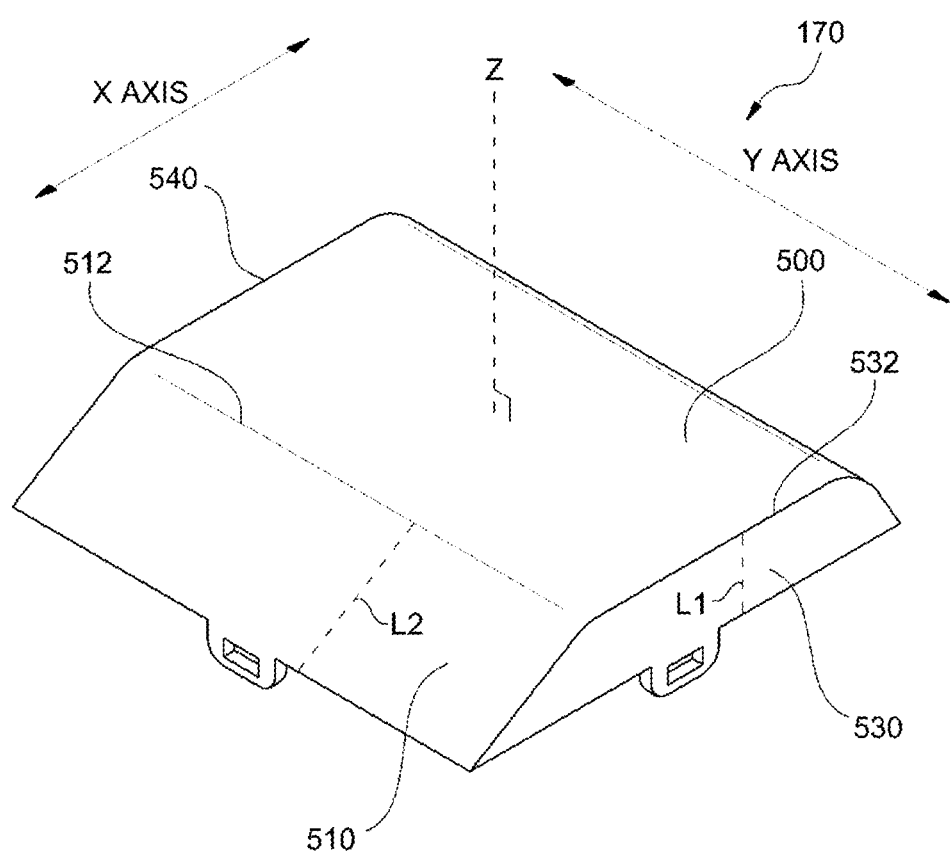
FIG. 7 is a perspective view illustrating the radome of the radar device for a vehicle according to one embodiment of the present invention in one direction.
Figure 8:
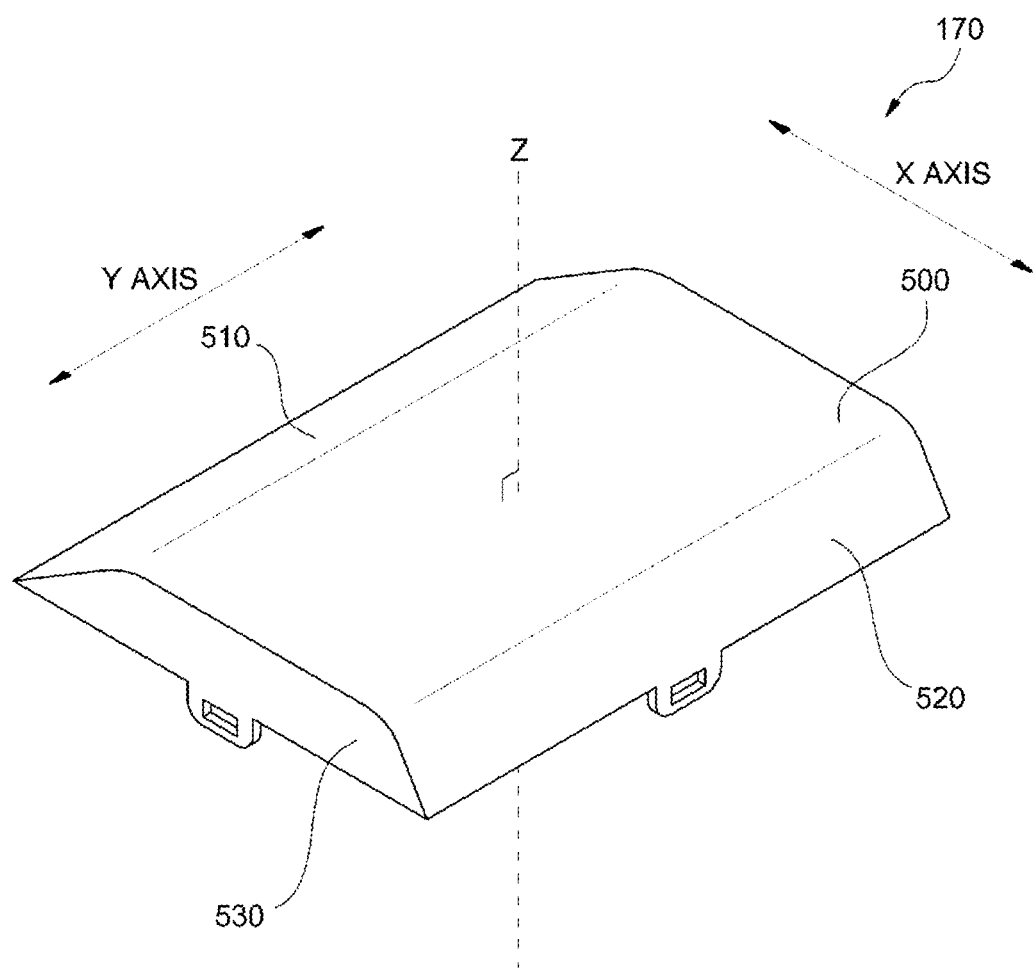
FIG. 8 is a perspective view illustrating the radome of the radar device for a vehicle according to one embodiment of the present invention in another direction.

FIG. 6 is a view illustrating a radome and a PCB of the radar device for a vehicle according to one embodiment of the present invention, FIG. 7 is a perspective view illustrating the radome of the radar device for a vehicle according to one embodiment of the present invention in one direction, and FIG. 8 is a perspective view illustrating the radome of the radar device for a vehicle according to one embodiment of the present invention in another direction.

Referring to FIG. 6, the PCB 150 includes a plurality of antenna arrays 400, 410, 420, and 430 and an IC chip 440.

The plurality of antenna arrays 400, 410, 420, and 430 are arranged in parallel to each other, and each of the antenna arrays 400, 410, 420, and 430 includes a plurality of wide angle antennas 402, 404, 406, and 408 arranged in a row. When the plurality of antenna arrays are disposed in parallel, a detection angle may be increased in a direction perpendicular to a direction in which the antenna arrays are disposed (which may be referred to as an X axis direction hereinafter for the sake of convenience in the description) and a detection distance may be increased in a direction perpendicular to a plane surface of the PCB 150 (which may be referred to as a Z axis direction hereinafter for the sake of convenience in the description). Here, each of the wide angle antennas may include a 77 GHz antenna using a 76 to 81 GHz frequency band. Accordingly, the radar device for a vehicle can be made to have a smaller size and a lighter weight than a radar device for a vehicle including an antenna using the 24 GHz band, and thus fuel efficiency of a vehicle may be increased.

The IC chip 440 is connected to the plurality of antenna arrays 400, 410, 420, and 430. For example, the IC chip 440 may include a RFIC for a mmWAVE.

Although not illustrated in the drawings, the IC chip 440 may be connected to the connector 120, a surface of the PCB 150 on which the plurality of antenna arrays 400, 410, 420, and 430 and the IC chip 440 are mounted may be coated with an antioxidant using an organic solderability preservatives (OSP) method. Accordingly, a phenomenon in which a performance of an antenna is changed due to gold plating can be inhibited.

Referring to FIGS. 6 to 8, the radome 170 includes a cover surface 500 facing the PCB 150, a first wall surface 510 connected to the cover surface 500, a second wall surface 520 connected to the cover surface 500 and facing the first wall surface, a third wall surface 530 connected to the cover surface 500 and interposed between the first wall surface 510 and the second wall surface 520, and a fourth wall surface 540 connected to the cover surface 500 and facing the third wall surface 530. Here, at least one of the first wall surface 510 and the second wall surface 520 is inclined with respect to a Z axis perpendicular to the cover surface 500, and the third wall surface 530 and the fourth wall surface 540 are in parallel to the Z axis perpendicular to the cover surface 500. That is, a line L1 drawn from a boundary 532 between the third wall surface 530 and the cover surface 500 along the third wall surface 530 in a direction that recedes from the cover surface 500 is parallel to the Z axis. In addition, a line L2 drawn from a boundary 512 between the first wall surface 510 and the cover surface 500 along the first wall surface 510 in a direction that recedes from the cover surface 500 is not parallel to the Z axis and may be obliquely formed to be inclined with respect to the Z axis.

In the same way, a line drawn from a boundary between the fourth wall surface 530 and the cover surface 500 along the fourth wall surface 540 in the direction that recedes from the cover surface 500 is parallel to the Z axis, and a line drawn from a boundary between the second wall surface 520 and the cover surface 500 along the second wall surface 520 in a direction that recedes from the cover surface 500 is not parallel to the Z axis and may be obliquely formed to be inclined with respect to the Z axis.

Here, the first wall surface 510 and the second wall surface 520 are disposed in the direction in which the plurality of antenna arrays are arranged (which may be referred to as a Y axis direction hereinafter for the sake of convenience in the description), and the third wall surface 530 and the fourth wall surface 540 are disposed in the direction perpendicular to the direction in which the plurality of antenna arrays are arranged (which may be referred to as the X axis direction hereinafter for the sake of convenience in the description).

The cover surface 500 of the radome 170 may have a flat shape. Accordingly, a thickness of the radome 170 may be decreased so that a small-sized radar device for a vehicle may be manufactured. Meanwhile, the first to fourth wall surfaces 510, 520, 530, and 540 are illustrated as flat shapes, but are not limited thereto. The first to fourth wall surfaces 510, 520, 530, and 540 may also have convex or concave shapes.

According to the embodiment of the present invention, an internal angle between the cover surface 500 and the first wall surface 510 or the second wall surface 520 of the radome 170 is different from an internal angle between the cover surface 500 and the third wall surface 530 or the fourth wall surface 540. For example, the internal angle between the cover surface 500 and the first wall surface 510 or the second wall surface 520 of the radome 170 may be greater than the internal angle between the cover surface 500 and the third wall surface 530 or the fourth wall surface 540. Here, an internal angle between the cover surface and a wall surface may be an internal angle between a tangent line and the cover surface at a point at with the cover surface is connected the wall surface.

According to the embodiment of the present invention, each of the internal angles between the cover surface 500 and the first and second wall surfaces 510 and 520 of the radome 170 may be greater than 90° and less than 180°. In addition, each of the internal angles between the cover surface 500 and the third and fourth wall surfaces 530 and 540 of the radome 170 may be approximately 90°. That is, the first wall surface 510 is not parallel to the second wall surface 520, and the third wall surface 530 may be parallel to the fourth wall surface 540. When each of the internal angles between the cover surface 500 and the first and second wall surfaces 510 and 520 is greater than 90° and less than 180° as described above, a distance between the first wall surface 510 and the second wall surface 520 may be increased in a direction that recedes from the cover surface 500. Accordingly, the radar device for a vehicle may have a wider field of view (FOV) in the direction perpendicular to the direction in which the plurality of antenna arrays are arranged (azimuth, that is the X axis direction) and improve an antenna gain in the direction in which the plurality of antenna arrays are arranged (elevation, that is the Y axis direction).

Meanwhile, the internal angle between the cover surface 500 and the first wall surface 510 of the radome 170 may be greater than the internal angle between the cover surface 500 and the second wall surface 520. For example, when radar devices 100 for a vehicle are disposed at both sides of the rear of a vehicle, an FOV may need to be wider in a lateral direction than in a rearward direction of the vehicle. Accordingly, an internal angle between the first wall surface 510 facing the outside, that is, in the lateral direction of the vehicle, and the cover surface 500 may be greater than an internal angle between the second wall surface 520 facing the inside, that is, in the rearward direction of the vehicle, and the cover surface 500.

Figure 9:
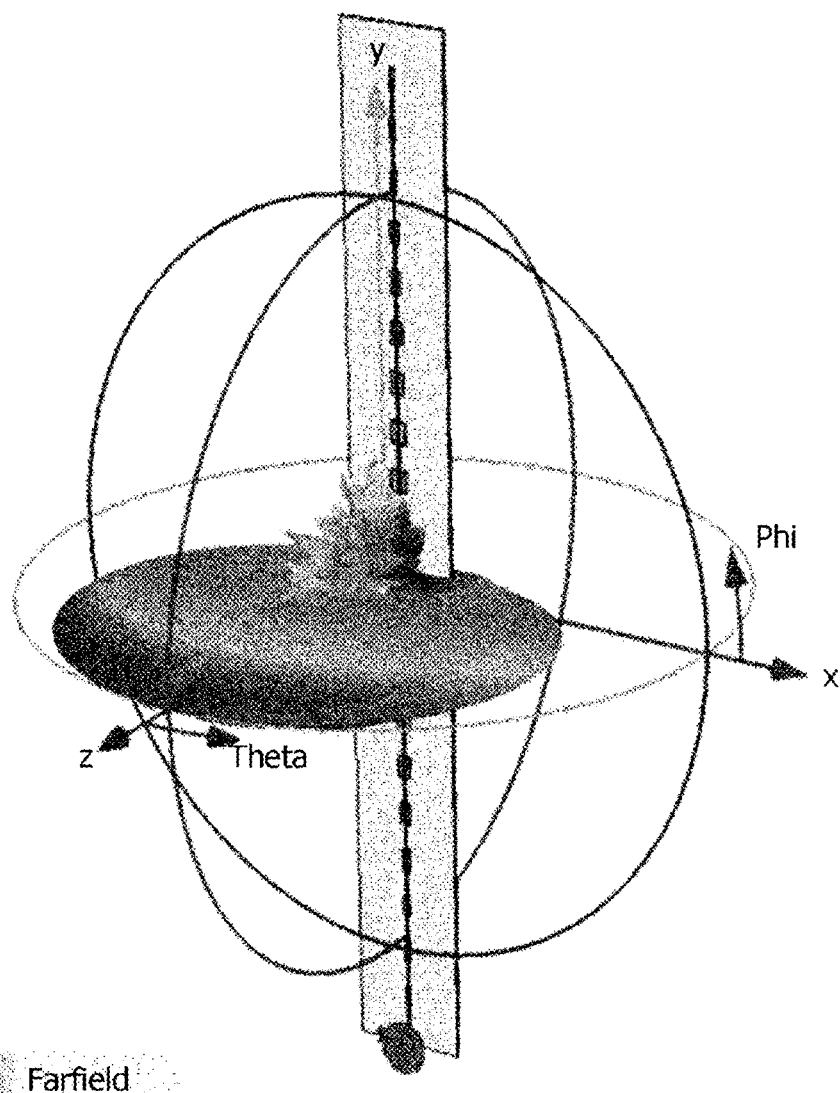
FIG. 9 is a view illustrating a three-dimensional beam pattern of an antenna array including wide angle antennas arranged in a row according to one embodiment of the present invention.
Figure 10:
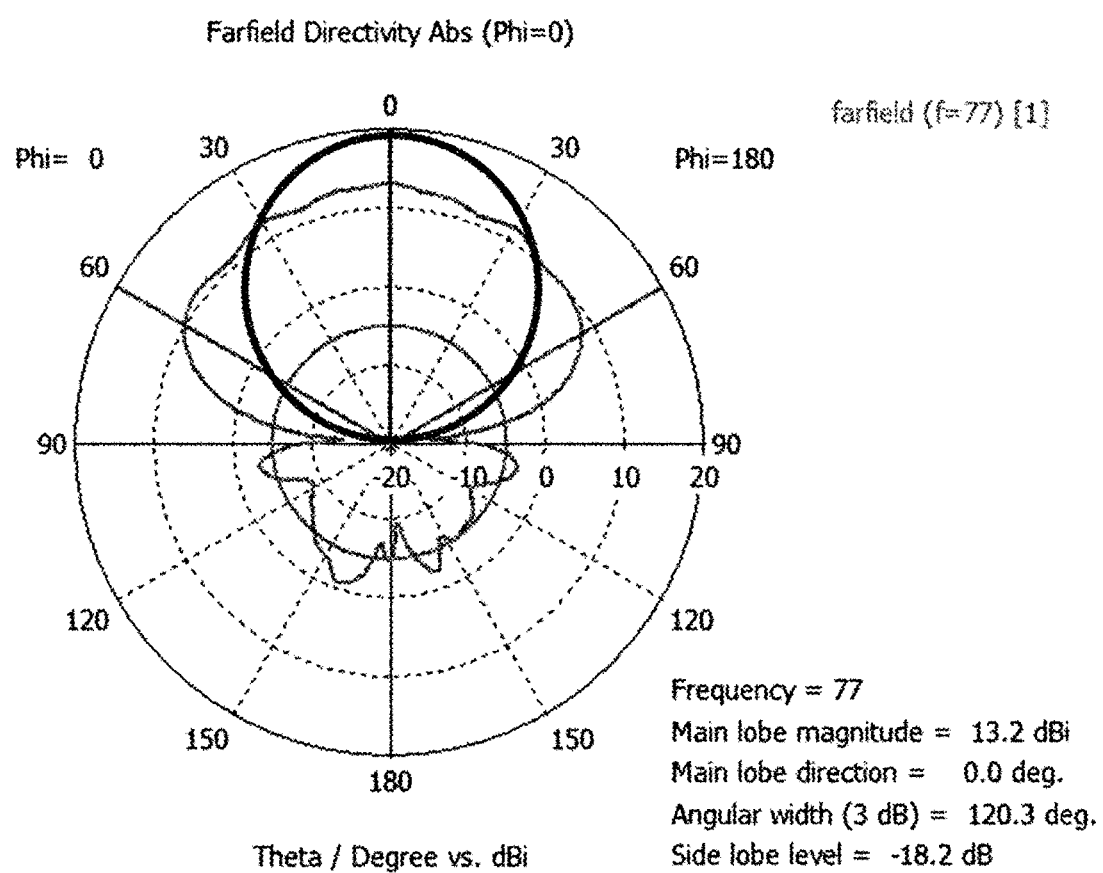
FIG. 10 is a view illustrating a simulation result of a field of view (FOV) of the radome according to one embodiment of the present invention.

FIG. 9 is a view illustrating a three-dimensional beam pattern of an antenna array including wide angle antennas arranged in a row according to one embodiment of the present invention, and FIG. 10 is a view illustrating a simulation result of an FOV of the radome according to one embodiment of the present invention.

Referring to FIG. 9, when the antenna array including the wide angle antennas is used, a beam width thereof may be increased in X, Y, and Z axis directions.

Referring to FIG. 10, an FOV B (approximately 150°) after application of the radome according to one embodiment of the present invention is increased by approximately 20° when compared to an FOV A (approximately 130°) before the application of the radome according to one embodiment of the present.

Figure 11:
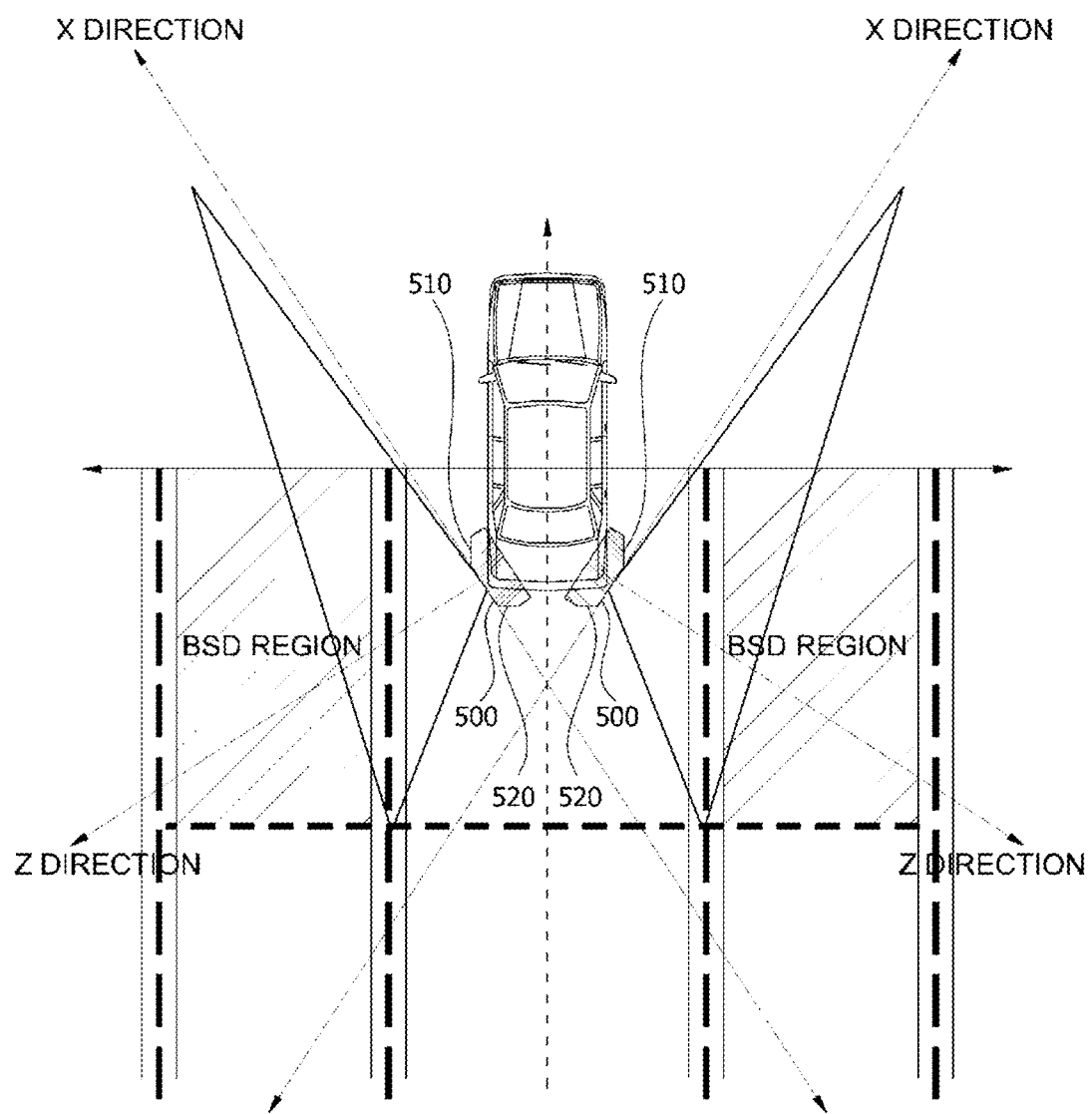
FIG. 11 is a view illustrating an example in which radar devices for a vehicle according to one embodiment of the present invention are installed at both sides of the rear of a vehicle.

FIG. 11 is a view illustrating an example in which radar devices for a vehicle according to one embodiment of the present invention are installed at both sides of the rear of a vehicle.

Referring to FIG. 11, blind spot detection (BSD) regions are generated in lateral and rearward directions of a vehicle. There is a problem in that BSD regions generated in the lateral direction of the vehicle are not completely covered by radar devices for a vehicle generally installed at the rear of the vehicle. According to one embodiment of the present invention, a plurality of antenna arrays may be arranged in a direction perpendicular to the X axis direction, the wall surfaces 510 and 520 may be disposed to be inclined in the X axis direction with respect to the cover surface 500 of the radome, and an internal angle between the wall surface 510 facing in the lateral direction of the vehicle and the cover surface 500 may be greater than an internal angle between the wall surface 520 facing in the rearward direction of the vehicle and the cover surface 500. Accordingly, since an FOV in the X axis direction, that is, specifically, an FOV in the lateral direction of the vehicle, is increased, the BSD region generated in the lateral direction of the vehicle may also be completely covered.

In addition, according to one embodiment of the present invention, the plurality of antenna arrays are arranged in parallel to the Y axis direction, and wall surfaces formed to be approximately perpendicular to the cover surface of the radome are disposed in the Y axis direction. Accordingly, since a gain of the antenna is increased, a remote detection performance can be increased in the Z axis direction.

Accordingly, when the radar device for a vehicle according to the embodiment of the present invention is used, wider side and rear views of the vehicle can be secured.

While the present invention has been described above with reference to the embodiments, it should be understood by those skilled in the art that various modifications and alterations may be made without departing from the spirit and scope of the present invention described in the appended claims.

REFERENCE NUMERALS

100: RADAR DEVICE FOR VEHICLE
110: CASE

120: CONNECTOR
130, 150: PCB
140: BRACKET
160: SHIELD PORTION
170: RADOME
180: WATERPROOF RING

The invention claimed is:

1. A radar device for a vehicle, comprising:
a case comprising an upper surface and a plurality of side surfaces extending downwardly from the upper surface;
a first printed circuit board (PCB) accommodated in the case and comprising formed thereon a plurality of antenna arrays and an integrated circuit (IC) chip connected to the plurality of antenna arrays; and
a radome coupled to the case and configured to cover the first PCB,
wherein the radome includes:
a cover surface having a flat shape facing the first PCB;
a first wall surface connected to the cover surface; and
a second wall surface connected to the cover surface and configured to face the first wall surface,
wherein the cover surface of the radome comprises an outer surface and an inner surface closer to the first PCB than is the outer surface,
wherein the first wall surface of the radome comprises an outer surface and an inner surface closer to the first PCB than is the outer surface,
wherein the second wall surface of the radome comprises an outer surface and an inner surface closer to the first PCB than is the outer surface,
wherein a distance between the inner surface of the first wall surface and the inner surface of the second wall surface is increased in a direction that moves away from the cover surface, and
wherein the first PCB is disposed between the cover surface of the radome and the upper surface of the case.

2. The radar device of claim 1, wherein the radome comprises:
a third wall surface connected to the cover surface and interposed between the first wall surface and the second wall surface; and
a fourth wall surface connected to the cover surface and configured to face the third wall surface,
wherein the third wall surface of the radome comprises an outer surface and an inner surface closer to the first PCB than is the outer surface,
wherein the fourth wall surface of the radome comprises an outer surface and an inner surface closer to the first PCB than is the outer surface,
wherein the inner surface of the first wall surface is not parallel to the inner surface of the second wall surface, and
wherein the inner surface of the third wall surface is parallel to the inner surface of the fourth wall surface.

3. The radar device of claim 2, wherein an internal angle between the inner surface of the cover surface and the inner surface of the first wall surface is greater than an internal angle between the inner surface of the cover surface and the inner surface of the second wall surface.

4. The radar device of claim 3,
wherein an internal angle between the inner surface of the cover surface and the inner surface of the third wall surface is less than both the internal angle between the inner surface of the cover surface and the inner surface of the first wall surface and the internal angle between the inner surface of the cover surface and the inner surface of the second wall surface, and
wherein an internal angle between the inner surface of the cover surface and the inner surface of the fourth wall surface is less than both the internal angle between the inner surface of the cover surface and the inner surface of the first wall surface and the internal angle between the inner surface of the cover surface and the inner surface of the second wall surface.

5. The radar device of claim 4, wherein:
each of the antenna arrays includes a plurality of wide angle antennas arranged in a row; and
the rows of the plurality of antenna arrays are arranged in parallel to each other.

6. The radar device of claim 5, wherein:
the first wall surface is disposed across from the second wall surface in a first direction;
the third wall surface is disposed across from the fourth wall surface in a second direction perpendicular to the first direction; and
wherein the rows of the plurality of antenna arrays extend in the second direction.

7. The radar device of claim 1, wherein the radar device for the vehicle is disposed at a rear of the vehicle.

8. The radar device of claim 1, comprising a shield portion interposed between the IC chip formed on the first PCB and the radome and configured to block a radio frequency (RF) signal generated by the first PCB.

9. The radar device of claim 1, comprising:
a second PCB accommodated in the case and comprising formed thereon a circuit for digital signal processing (DSP); and
a connector configured to connect the first PCB and the second PCB to an external device,
wherein the second PCB is disposed between the cover surface of the radome and the upper surface of the case.

10. The radar device of claim 9, comprising a bracket interposed between the first PCB and the second PCB and configured to block noise generated by the second PCB.

11. The radar device of claim 9, wherein the connector includes a controller area network (CAN) connector.

12. A radome of a radar device for a vehicle, comprising:
a cover surface configured to cover a printed circuit board (PCB), on which a plurality of antenna arrays and an integrated circuit (IC) chip connected to the plurality of antenna arrays are formed, and having a flat shape facing the PCB;
a first wall surface connected to the cover surface; and
a second wall surface connected to the cover surface and configured to face the first wall surface,
wherein the cover surface of the radome comprises an outer surface and an inner surface configured to be closer to the first PCB than is the outer surface,
wherein the first wall surface of the radome comprises an outer surface and an inner surface configured to be closer to the first PCB than is the outer surface,
wherein the second wall surface of the radome comprises an outer surface and an inner surface configured to be closer to the first PCB than is the outer surface,
wherein a distance between the inner surface of the first wall surface and the inner surface of the second wall surface is increased in a direction that moves away from the cover surface.

13. The radome of claim 12, comprising:
a third wall surface connected to the cover surface and interposed between the first wall surface and the second wall surface; and a fourth wall surface connected to the cover surface and configured to face the third wall surface, wherein the third wall surface of the radome comprises an outer surface and an inner surface closer to the first PCB than is the outer surface, wherein the fourth wall surface of the radome comprises an outer surface and an inner surface closer to the first PCB than is the outer surface, wherein the inner surface of the first wall surface is not parallel to the inner surface of the second wall surface, and wherein the inner surface of the third wall surface is parallel to the inner surface of the fourth wall surface.

14. The radome of claim 13, wherein an internal angle between the inner surface of the cover surface and the inner surface of the first wall surface is greater than an internal angle between the inner surface of the cover surface and the inner surface of the second wall surface.

15. The radome of claim 14, wherein an internal angle between the inner surface of the cover surface and the inner surface of the third wall surface is less than both the internal angle between the inner surface of the cover surface and the inner surface of the first wall surface and the internal angle between the inner surface of the cover surface and the inner surface of the second wall surface, and wherein an internal angle between the inner surface of the cover surface and the inner surface of the fourth wall surface is less than both the internal angle between the inner surface of the cover surface and the inner surface of the first wall surface and the internal angle between the inner surface of the cover surface and the inner surface of the second wall surface.

16. A radome of a radar device for a vehicle, comprising:

a cover surface configured to cover a printed circuit board (PCB), on which a plurality of antenna arrays and an integrated circuit (IC) chip connected to the plurality of antenna arrays are formed, and having a flat shape facing the PCB;

a first wall surface connected to the cover surface;

a second wall surface connected to the cover surface and configured to face the first wall surface;

wherein the cover surface of the radome comprises an outer surface and an inner surface configured to be closer to the first PCB than is the outer surface, wherein the first wall surface of the radome comprises an outer surface and an inner surface configured to be closer to the first PCB than is the outer surface, wherein the second wall surface of the radome comprises an outer surface and an inner surface configured to be closer to the first PCB than is the outer surface, wherein both of the inner surface of the first wall surface and the inner surface of the second wall surface are inclined with respect to an axis perpendicular to the cover surface.

17. The radome of claim 16, comprising:

a third wall surface connected to the cover surface and interposed between the first wall surface and the second wall surface; and a fourth wall surface connected to the cover surface and configured to face the third wall surface, wherein the third wall surface of the radome comprises an outer surface and an inner surface closer to the first PCB than is the outer surface, wherein the fourth wall surface of the radome comprises an outer surface and an inner surface closer to the first PCB than is the outer surface, wherein both of the inner surface of the third wall surface and the inner surface of the fourth wall surface are in parallel to the axis perpendicular to the cover surface.

* * * * *